United States Patent [19]

Mandl

[11] 4,308,911
[45] Jan. 5, 1982

[54] RESIDENTIAL MONITORING AND CONTROL SYSTEM

[76] Inventor: William J. Mandl, 8303 Faust Ave., Canoga Park, Calif. 91303

[21] Appl. No.: 93,533

[22] Filed: Nov. 13, 1979

[51] Int. Cl.³ .................. F24F 3/00; G08B 23/00
[52] U.S. Cl. ................................ 165/22; 340/521; 340/501; 340/506; 340/588; 165/16; 165/26; 165/30; 236/46 R
[58] Field of Search .............. 340/521, 500, 501, 506, 340/588, 589; 165/16, 22, 30, 26, 27, 28, 11 R; 236/46 R, 51, 1 C

[56] References Cited

U.S. PATENT DOCUMENTS

| | | | |
|---|---|---|---|
| 3,709,289 | 1/1973 | Weatherston | 165/26 |
| 3,724,534 | 4/1973 | Weatherston | 165/22 |
| 3,942,718 | 3/1976 | Palmieri | 165/26 |
| 4,071,745 | 1/1978 | Hall | 165/22 |
| 4,078,601 | 3/1978 | Kolbow | 236/1 C |

Primary Examiner—John W. Caldwell, Sr.
Assistant Examiner—Donnie L. Crosland
Attorney, Agent, or Firm—Freilich, Hornbaker, Wasserman, Rosen & Fernandez

[57] ABSTRACT

A system particularly suited for residential use for monitoring various input sensors and for controlling various output devices including heat and air condition units, control motors, and alarms. A system in accordance with the invention includes one or more of the following control subsystems:

(1) Security Subsystem
(2) Heat/Air Condition Subsystem
(3) Controlled Device Subsystem
(4) Priority Shutdown Subsystem 7 Claims, 11 Drawing Figures

RESIDENTIAL MONITORING AND CONTROL SYSTEM

BACKGROUND OF THE INVENTION

The present invention relates to a system particularly suited for use in a residence for monitoring various input sensors and for controlling various output devices for one or more of the following purposes:

(1) To warn of burglar intrusion and visually display the point of intrusion;

(2) To warn of fire (smoke and/or heat) conditions and visually display the location of the condition;

(3) To control heat and air condition units and establish the desired temperature in each of a plurality of different zones;

(4) To identify open windows and doors;

(5) To warn if extreme temperature settings are wasting energy;

(6) To control sun shades or drapes to best utilize the sun for heating and lighting;

(7) To control various household items such as electrical outlets or water valves used in sprinkler or pool fill systems;

(8) To regulate energy consumption to minimize energy costs for demand rate meter users;

(9) To control foodcooking appliances for minimum energy waste unattended cooking.

SUMMARY OF THE INVENTION

An exemplary embodiment in accordance with the invention includes one or more of the following subsystems:

(1) Security Subsystem
(2) Heat/Air Condition Subsystem
(3) Controlled Device Subsystem
(4) Priority Shutdown Subsystem The security subsystem monitors three functionally different categories of sensors; namely (1) fire (e.g. smoke and/or heat) sensors, (2) entrance point (i.e. normally used doors) sensors and (3) intrusion point (e.g. windows) sensors. In accordance with a significant feature of the exemplary embodiment, the subsystem will respond to a breach during a "turn on" interval, by sounding a local alarm and causing a video display to identify the particular point breached. In accordance with a further feature of the security subsystem, means are provided to enable a user to selectively mask certain sensors to avoid a breach at the point producing a local alarm. In accordance with a still further feature, means are provided to enable a user to selectively mask certain sensors to avoid a breach at that point activating a main alarm.

The heat/air condition subsystem monitors a dual setpoint master thermostat and a plurality of triple setpoint zone thermostats to selectively control one or more heating units and one or more air condition units. In accordance with a significant feature of the exemplary embodiment, the residence is segregated into different zones and the subsystem selectively controls (i.e. opens or closes) the duct vents in each zone. In accordance with a further feature, the zone thermostats are configured so as to allow a user to define three distinct temperature settings (i.e. low, middle, high). Normally, the subsystem controls the heat and air condition units based on middle setting but whenever the system is in an "energy save" mode, as controlled by a time-of-day-on/off control or by the priority shutdown subsystem, control is based on the high and low settings. In accordance with a still further feature, means are provided to automatically adjust the middle setting dependent upon whether a heater or air condition mode is commanded by a master thermostat. In accordance with a further feature, an alarm is activated if the temperature of the master thermostat exceeds the highest setpoint while a heat unit is on or falls below the lowest setpoint while an air conditioner is on. Activation of the alarm identifies the then active zones on the video display. In accordance with a still further feature, means are included in the heat/air condition subsystem for turning off all heat and air condition units in response to a fire alarm condition sensed by the security subsystem.

The controlled device subsystem is used to control various output devices such as sun shades, drapes, electrical outlets, water valves, etc., primarily in response to preset timers and a time-of-day clock. In accordance with a significant feature of the exemplary embodiment, the subsystem is capable of selective operation in either a pulse mode or a level mode. In response to a "begin" time register, the controlled device is activated for a selected predetermined pulse interval when in the pulse mode. The pulse mode is preferably used to operate sun shades or drape motors, for example, in order to partially or fully open or close them. The level mode, on the other hand, may be used to power an electrical outlet, for example, which may energize a coffee pot or an electric heater for an automobile. In accordance with a further feature, the circuitry for controlling the sun shade or drape motor is responsive to the current mode of the heat/air condition subsystem, as well as a local sensor responsive to ambient light level to, for example, avoid gaining solar radiation heat by opening the sun shade or drape if the air condition unit is on.

The priority shutdown subsystem is useful primarily for homeowners on a demand rate meter system to lower their costs of electrical energy. For homeowners who are not on such a system, it is nevertheless useful to effect the controlled power shutdown or startup procedure. In accordance with a significant feature, the priority shutdown subsystem is able to force selected zones of the heat/air condition subsystem into an energy save mode.

Although the aforementioned subsystem can operate essentially independently of one another, it is preferable that they be activated in sequence by a common controller and that they time share certain common elements such as power supplies, video display, time-of-day (or week or month) clocks, etc. In a preferred embodiment, the common controller comprises a microprocessor central processing unit controlled by a program implemented by firmware in a read only memory (ROM). Although each subsystem is disclosed herein as being implemented by logical hardware, it will be recognized by those skilled in the art that each subsystem can alternatively be implemented by a microprocessor operated in accordance with a stored program, manifested either in firmware or software, which equivalently monitors and controls the sensors and output devices discussed.

DETAILED DESCRIPTION

Figure 1:
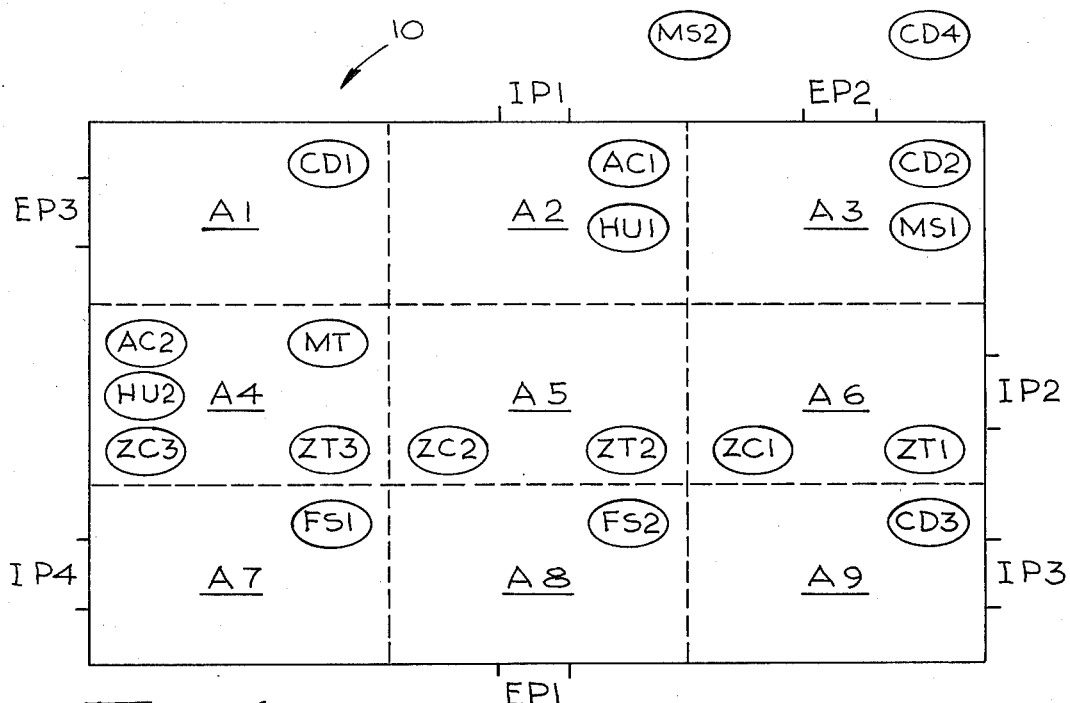
FIG. 1 is a diagramatic representation of a multiple room residence indicating thereon various sensors, heat/air condition units and controls, controlled devices, etc.

Attention is initially directed to FIG. 1 which comprises a schematic diagram generally depicting a residence 10 including a plurality of separate rooms or areas A1-A9. In accordance with the present invention, entrance and intrusion sensors are respectively located proximate to all the doors and windows to provide an electrical signal indicating whether the door or window is open. The sensors associated with the normal entrance points, that is the doors, are identified in FIG. 1 as EP1-EP3. The sensors located proximate to the intrusion points, that is, windows, are respectively identified in FIG. 1 as IP1-IP4. In addition to the entrance point and intrusion point sensors, fire (heat and/or smoke) sensors are positioned throughout the residence 10 and are respectively identified in FIG. 1 as FS1-FS3. The entrance, intrusion, and fire sensors are used primarily by the security subsystem to be discussed hereinafter.

The residence depicted in FIG. 1 also includes one or more heat units HU1,HU2 and air conditioner units AC1, AC2. In accordance with the invention, the heat unit and air condition unit are controlled primarily in response to a master thermostat MT operating in conjunction with a plurality of zone thermostats ZT1-ZT3. As will be discussed hereinafter, the zone thermostats are positioned within the residence in order to differently control the temperatures in various zones within the residence. It has arbitrarily been assumed that zone 1 includes areas A3, A6 and A9, zone 2 includes areas A2, A5 and A8, and zone 3 includes areas A1, A4 and A7. In addition to the zone thermostats located in each zone, each zone also includes a zone control means, depicted in FIG. 1 as ZC1-ZC3. As will be discussed hereinafter, each zone control means controls the delivery of warm or cool air to a zone and may, for example, comprise a relay or motor controlling a vent in the duct system of a forced air system.

FIG. 1 further depicts miscellaneous sensors MS1 and MS2 such as moisture or water level sensors. Also depicted in FIG. 1 are controlled devices CD1-CD4 which may typically comprise motors for controlling sun shades or drapes or relays for controlling electrical outlets or water valves such as are used in lawn sprinkler or swimming pool fill systems.

Although a preferred embodiment of the present invention utilizes and integrates all of the subsystems disclosed herein, for the sake of clarity, the subsystems will initially be individually discussed.

SECURITY SUBSYSTEM

Figure 2:
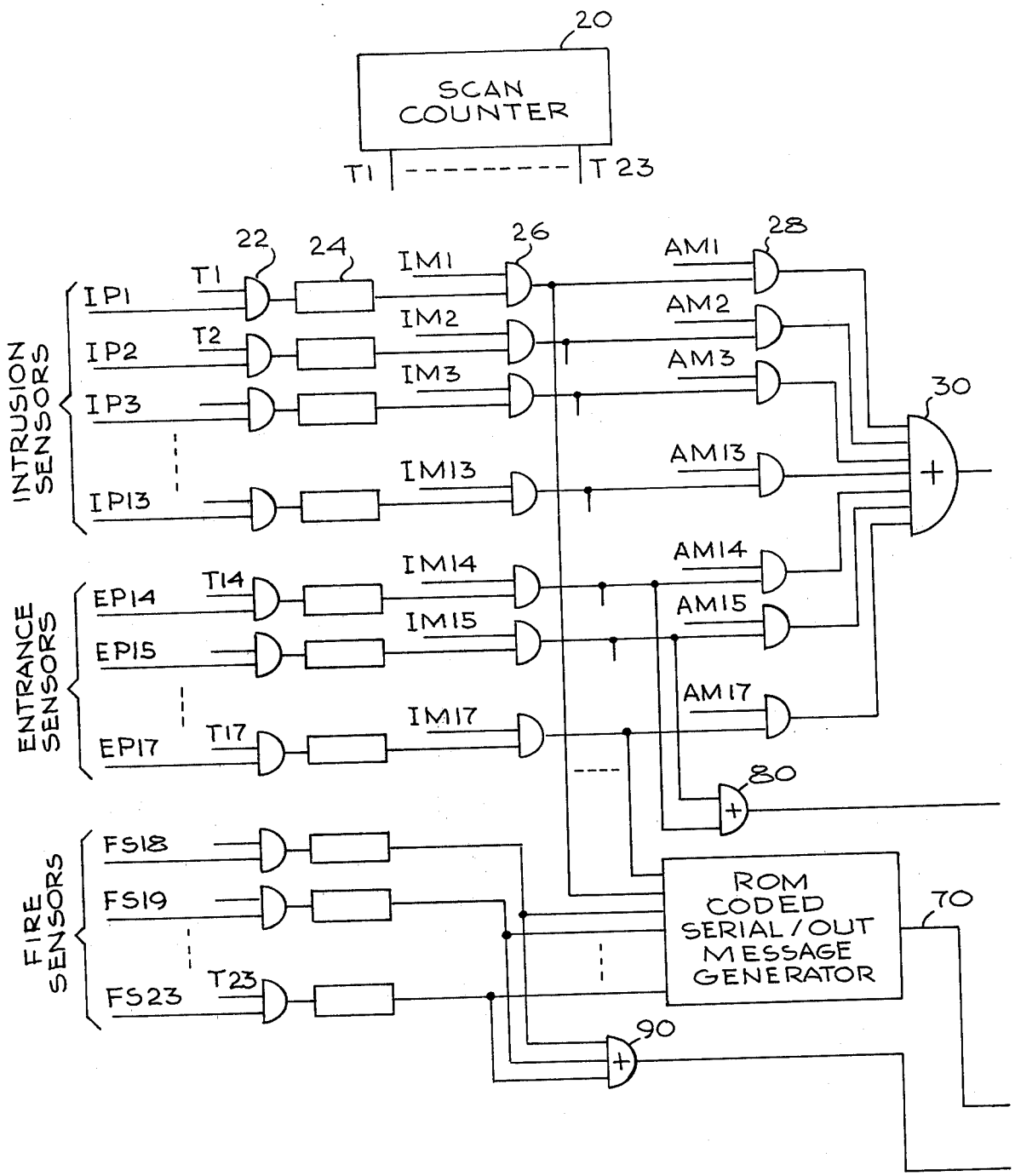
FIG. 2 [comprised of 2(1) and 2(2)] is a block schematic diagram of a security subsystem in accordance with the present invention.

The security subsystem depicted in FIG. 2 is used both for fire and intrusion detection. The subsystem responds to a plurality of sensors which can generally be categorized into three types; namely, intrusion sensors, entrance sensors, and fire sensors. In the exemplary embodiment of FIG. 2, thirteen intrusion or window sensors IP1-IP13 have been assumed, four entrance or door sensors EP14-EP17 have been assumed, and six fire sensors FS18-FS23 have been assumed. The subsystem of FIG. 2 includes a scan counter 20 which sequentially defines counts or time slots T1-T23. During each of the time slots a different one of the twenty three security subsystem sensors is examined. Each of the sensors comprises a binary device capable of indicating one of two states. Thus, the intrusion and entrance sensors are capable of indicating whether the window or door with which they are associated is open or closed. Each fire sensor indicates whether or not the smoke or heat level in its area exceeds a certain threshold. Each of the sensors is connected to the input of a dedicated AND gate 22 each of which is enabled coincident with a different count of the scan counter 20. Inasmuch as all of the intrusion sensors are handles essentially identically, for convenience, the apparatus and operation associated with only one of the sensors IP1 will be discussed in detail. Similarly, since the entrance sensors and fire sensors operate similarly to the intrusion sensors, their operation will not be explained in detail but rather, will primarily be discussed in terms of how their operation differs from that of the intrusion sensors.

Prior to describing the details of the apparatus depicted in FIG. 2, the overall operation of the subsystem will be considered briefly. Initially the user is able to control the activation of the system operation by use of a security switch 23 which is controlled by a coded key or magnetic card or similar means such as a combination push button sequence. In any event, the key controlled security switch 23 develops an output signal whose logic level when the switch is closed is represented by KEY. When the security switch is open, its logic level is represented by $\overline{KEY}$. In addition to describing the logic levels of a signal in these terms (i.e. KEY and its compliment $\overline{KEY}$) reference herein will sometimes be made to a pulse, as represented by a change in level of the logic signal. This pulse condition will be represented by the nomenclature (KEY) to indicate a change to logic level KEY. $(\overline{KEY})$ will represent a change to logic level $\overline{KEY}$. The foregoing nomenclature system will also be used herein to describe other signal levels associated with various manual switches, flip flops and converters.

Continuing now with an overall description of the operation of the security subsystem of FIG. 2, as a consequence of the user closing the aforementioned key controlled security switch 23, a turn-on delay interval, assumed to be on the order of four minutes, is initiated. During this turn-on interval, any breaches detected by the intrusion sensors IP1-IP13 or the entrance sensors EP14-EP17 will produce a local alarm but will not produce a main alarm. That is, a local alarm is used to alert the system user of an alarm condition such as a door or window being open. A first main alarm may typically comprise a loud audible alarm which is intended to alert neighbors as well as the user and to frighten an intruder into leaving. Alternatively, or in addition, a second main alarm may automatically initiate a voice or digital modem telephone call to the police department or other security service. The local alarm, on the other hand, is merely intended to attract the attention of the user in the residence.

After the termination of the four minute turn-on interval, any breach recognized by the intrusion sensors or entrance sensors will activate the main alarm as well as the local alarm. During the turn on interval, in association with the generation of the local alarm, means are provided for energizing a video display which will display the identity of the particular sensor generating the alarm condition. The user can then attend to closing the particular door or window which produced the alarm condition or, as will be discussed hereinafter, can elect to mask that particular sensor input if desired. Thus, the turn on delay interval is used to enable the user to eliminate or mask conditions which would cause a main alarm after the time out of the turn on interval.

Because the user may, for example, be going out for the evening after setting up the security subsystem, a means is provided for extending the turn on interval. Preferably a switch is located in association with a normal exit door which switch generates a logic level HOLD when closed and a logic level $\overline{HOLD}$ when open. The pulse condition when the hold switch switches from close to open is represented by $(\overline{HOLD})$. Thus, if the user leaves the residence through the approved exit door, he will open the hold switch to thereby extend the turn on interval.

Additionally, in order to enable the user to return home without actuating the main alarm, a means is provided for responding to a breach at preselected ones of said entrance points to initiate an entry sense delay interval, assumed to be on the order of one minute. During this one minute interval, the main alarm will not be activated thus giving the user time to turn off or reset the subsystem. In addition to the aforementioned conditions for enabling and disabling the main alarm, a time-of-day-on/off controller is provided to enable the user to easily pre-establish those times during the day when he wants the security subsystem to be active. Preferably, the time-of-day-on/off controller disables the main alarm only with respect to the intrusion and entrance sensors. In the exemplary embodiment illustrated in FIG. 2, the fire sensors FS18–FS23 are incapable of being masked and are not subject to being disabled by the aforementioned delay counters or time-of-day controller. In addition, alarm duration timers are activated by the main alarm to limit the maximum duration of the main alarm as well as to define the alarm hold off time.

Figure 2A:
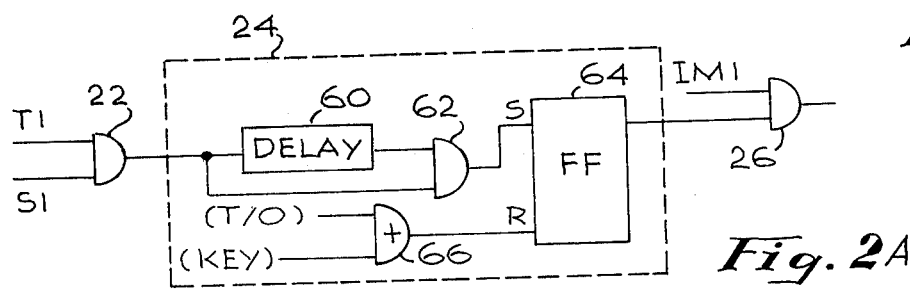
FIG. 2A is a block diagram of a delay and latch circuit useful in the subsystem of FIGS. 2(1) and 2(2)
Figure 2:
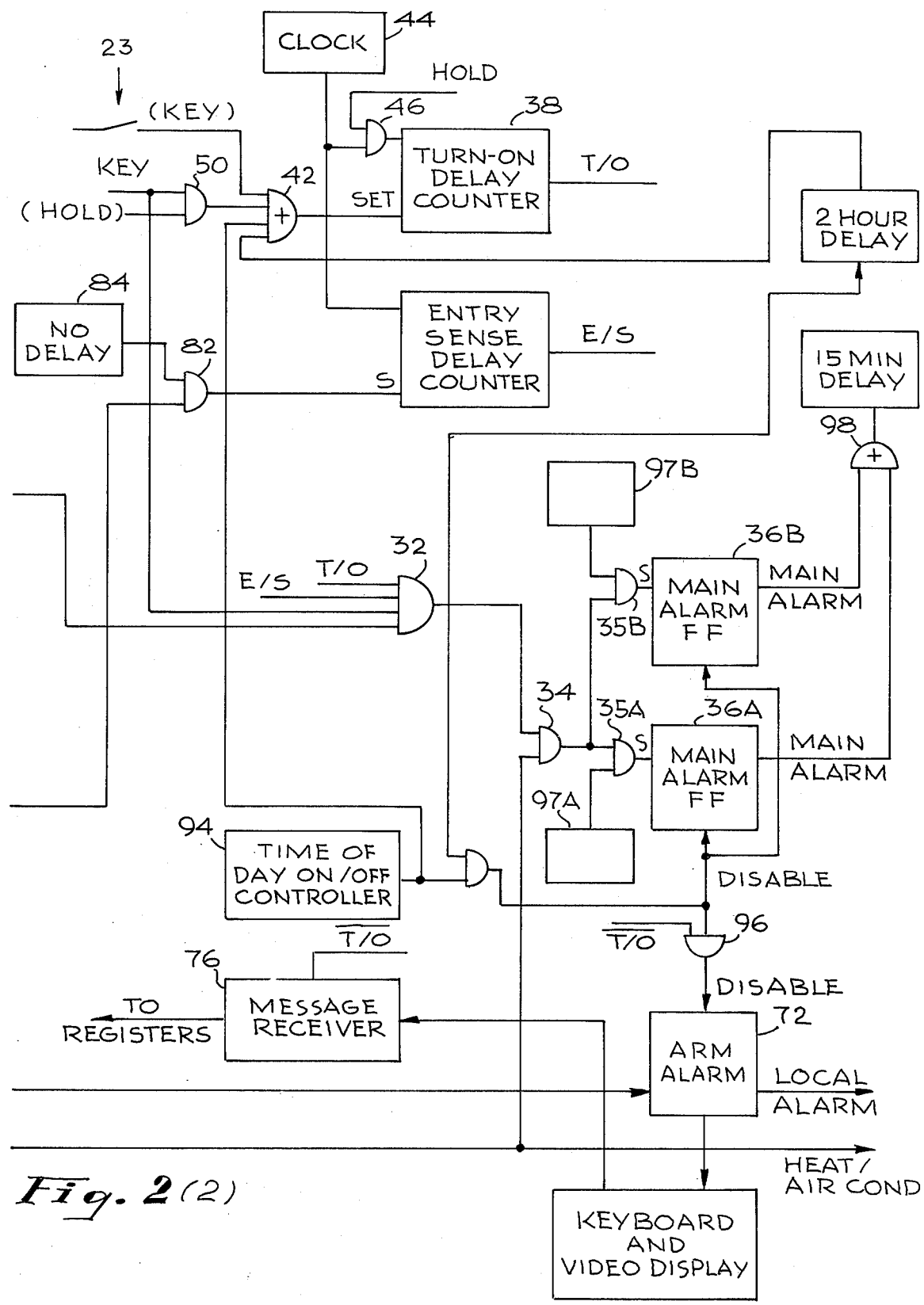

Returning now to the description of FIG. 2, it will be noted that the output of AND gate 22 is connected to the input of a delay and latch network 24. The delay and latch network 24 is disclosed in detail in FIG. 2A and will be discussed hereinafter. The output of network 24 is connected to the input of AND gate 26. The second input to AND gate 26 is derived from a corresponding stage of an input mask register (not shown). The input mask register contains a number of stages equal to the sum of the intrusion and entrance sensors. The ouput of gate 26 is coupled to the input of gate 28 whose second input is derived from a corresponding stage of an alarm mask register (not shown) also containing a number of stages equal to the sum of the intrusion and entrance sensors. The outputs of all the gates 28 are connected to the input of gate 30 whose output is connected to the input of AND gate 32. The output of AND gate 32 is connected to the input or OR gate 34 which is connected via AND gates 35A and 35B to the set input terminals of main alarm flip flops 36A and 36B. The second and third inputs to AND gate 32 are derives respectively from the output terminals of the turn on delay counter 38 and the entry sense delay counter 40. A fourth input to gate 32 comprises the logic level KEY.

The turn on delay counter 38 is provided with a set input terminal controlled by the output of OR gate 42. That is, a true output of OR gate 42 will set the counter 38 to its maximum count and then it will count down in response to clock pulses provided by clock pulse source 44 applied through AND gate 46 to the count input terminal of counter 38. The output of the turn on delay counter 38 will be represented by a logic level $\overline{T/O}$ while the counter is counting. After the counter 38 times out, its output will be represented by logic level T/O.

As previously pointed out, the counter 38 can be set to initiate the turn on interval by the user closing the key controlled security switch to generate the pulse (KEY). This is indicated as one input to OR gate 42. With the security switch closed to provide an enabling logic level KEY to the input of and gate 50, the turn on delay counter 38 can also be set if the hold switch associated with the normal exit door is closed. As long as the hold switch associated with the normal exit door is closed, the turn on delay counter can count down via gate 46. While the hold switch is open, (i.e. hold) the clock pulses to the counter 38 are interrupted. It has previously been mentioned that during the turn on interval defined by delay counter 38, AND gate 32 will be disabled so that any alarm condition reported by OR gate 38 will not set the main alarm flip flops 36.

Assume now that the delay counter 38 has timed out so that its output is represented by logic level T/O. Also assume that the entry sense delay counter 40 has timed out and that its output is represented by the logic level E/S. Further assume that the key operated security switch is closed and that intrusion sensor IP1 generates a true signal so that at time slot T1 gate 22 provides a true output. The output of gate 22 is supplied to the delay and latch network 24. Network 24 includes a delay element 60 having a delay equal to a cycle of the scan counter 20. The output of delay element 60 is applied to the input of AND gate 62 together with the output of AND gate 22. The effect of the delay element 60 and AND gate 62 is to insure that before a breach is responded to, it exists for two successive cycles of the scan counter 20. If it does, then AND gate 62 will set flip flop 64. Flip flop 64 in turn will provide a true output to AND gate 26 whose output in turn will also be true unless the particular sensor input is masked by the signal IM1 from the mask register being false. The flip flop 65 is reset via OR gate 66 in response either.

The outputs of the intrusion and entrance sensor gate 26 and the outputs of the fire sensor networks 24 are connected to the to the input of a message generator 68. Message generator 68 preferably includes a read only memory and responds to each of its inputs being true by providing an alphanumerical character stream output on line 70 which identifies the particular sensor generating an alarm condition; e.g. "BEDROOM ONE". An arm alarm logic circuit 72 responds to the message generator output by producing a local audible alarm and by applying power to a video display device 74 to produce a text display advising the user that a breach has occurred in Bedroom One. Device 74 includes a keyboard connected to a message receiver 76 74 displays the identification of the alarming sensor. The keyboard of the device 74 is connected to a message receiver 76 which is enabled during the turn on interval T/O. The user, via the keyboard 74, and the message receiver 76, can selectively load the input mask and alarm mask registers. It will be recalled that the alarm mask register is utilized to mask an alarm condition generated by either the intrusion or entrance sensors to prevent the masked sensor from activating the main alarms. Thus, a particular entrance sensor might be masked by use of the alarm mask register in order to permit an expected person to enter the residence through that entrance without activating the main alarm. The input mask register on the other hand is utilized to permit the local alarm, as well as the main alarm, to ignore a breach indicated by that sensor. Thus, if a particular sensor is masked by use of the input mask register, it is effectively operationally removed from the subsystem.

Instead of masking an entrance sensor to permit entry therethrough without actuating the main alarm, selected ones of the entrance sensors can be connected via OR gate 80 to initiate the aforementioned entry sense delay interval. More particularly, AND gate 80 can be connected so as to respond to the output of selected ones of the gates 26. When the output of one of these gates indicates a breach, OR gate 80 will in turn provide a true input to AND gate 82 whose output is connected to the set input terminal of the entry sense delay counter 40. Thus, a breach at one of the selected entrance sensors has the effect of iniating the one minute delay defined by counter 40. During this interval, gate 32 will be disabled. Thus, only after the delay counter 40 has timed out will it be possible to enable gate 32 and thus set the main alarms 36. A special no delay flip flop 84 which can be set by the user via the keyboard is provided to enable the user to eliminate the delay introduced by the counter 40. Thus, if the no delay flip flop 84 provides a false output signal to gate 82, then a breach detected by a selected entrance sensor is unable to set the entry sense delay counter 40.

An OR gate 90 is provided to respond to an alarm condition detected by any of the fire sensors. The output of OR gate 90 is connected to the input of previously mentioned OR gate 34 to immediately set the main alarm 36 independent of whether a turn on or entry sense delay interval is being defined. In addition, the output of OR gate 90 is preferably supplied to the heat/air condition emergency shut off input terminal to turn the heat and air conditioner units off.

Both the main alarm flip flop 36 and the arm alarm circuit 72 are provided with means for enabling them to be manually reset. Additionally, a time-of-day-on/off controller 94 is provided to selectively disable the system on a regular timed basis. Assume for example that the user is away on vacation and desires that the security subsystem allow a housecleaner to enter between 10 and 11 a.m. every day. The controller 94 functions to disable the main alarm flip flop 36 and arm alarm circuit 72 during the time preset into the controller 94. The output of controller 94 is passed through a gate 96 to the disable input of the arm alarm circuit 72. A second input to the gate 96 is derived from the turn on delay counter 38. Thus, the arm alarm circuit 72 is disabled by the controller 94 only if the turn on interval is not being defined by the counter 38. This feature enables the user to go through his turn on sequence at any time, regardless of the setting of the time-of-day-on/off controller 94. That is, if the user desires to check the state of all of the intrusion and entrance sensors to determine whether a breach exists, he can, utilizing his coded key to close the security switch, initiate the turn on interval and this will allow the arm alarm circuit 72 to control the video display device 74 to indicate whether any breaches exist.

The output of controller 94 is also coupled to the input of OR gate 42 so that whenever the controller turns the system on, it goes through the same turn-on sequence that occurs when the system is turned on via the key controlled security switch.

Reference has been made to OR gate 34 which produces a signal to set either or both of the main alarm flip flops 36A and 36B via gates 35A and 35B. Gates 35A and 35B are enabled by user controlled selection flip flops 97A and 97B.

Actuation of either main alarm flip flop activates a fifteen minute delay via gate 98. At the end of this fifteen minute delay, a two hour delay is initiated and main alarm flip flops 36A and 36B are disabled via gate 99. At the end of the two hour delay, the turn on sequence is again activated via gate 42.

HEAT/AIR CONDITION SUBSYSTEM

Figure 3:
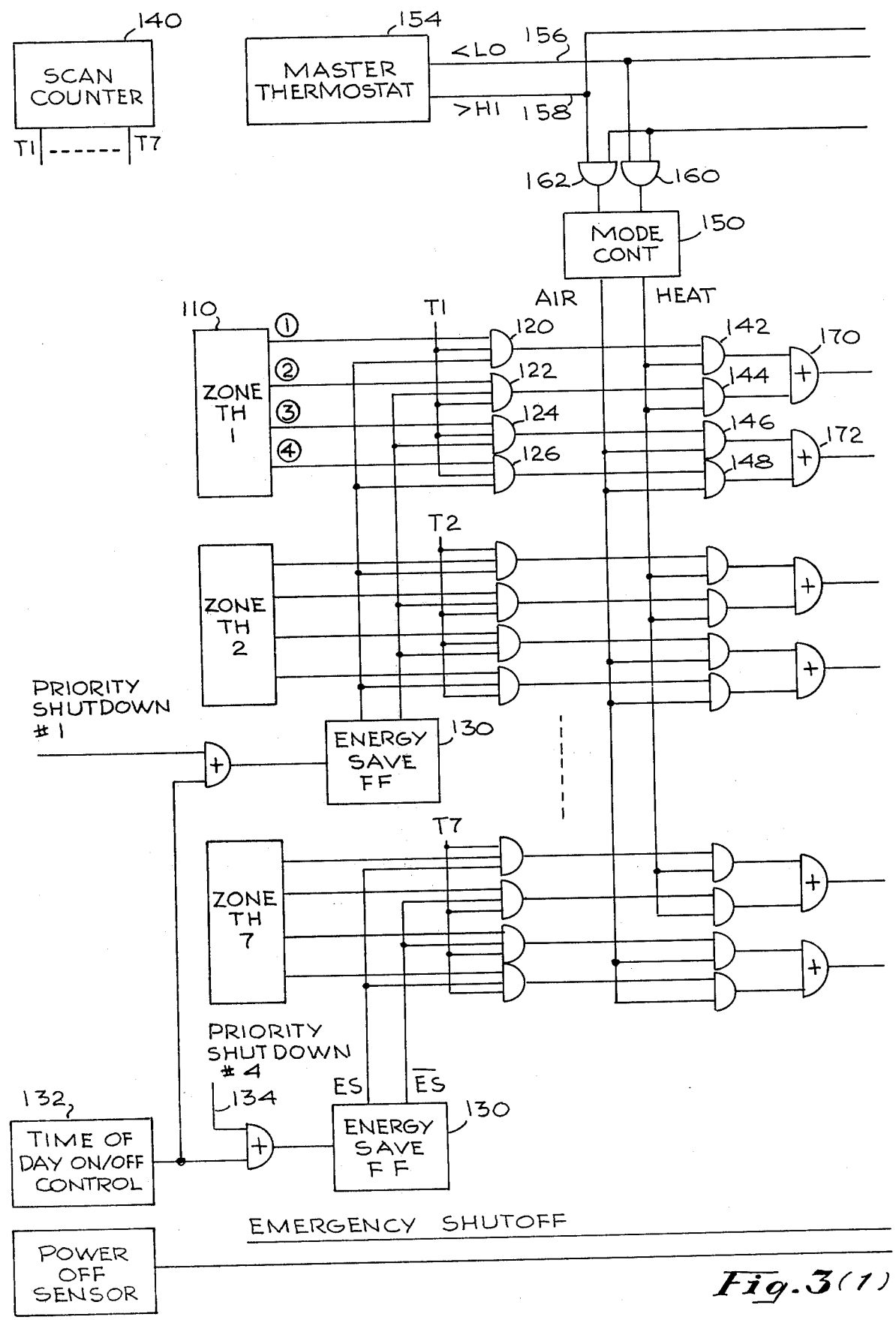
FIG. 3 [comprised of 3(1) and 3(2)] is a block schematic diagram of a heat/air condition subsystem in accordance with the present invention.
Figure 3:
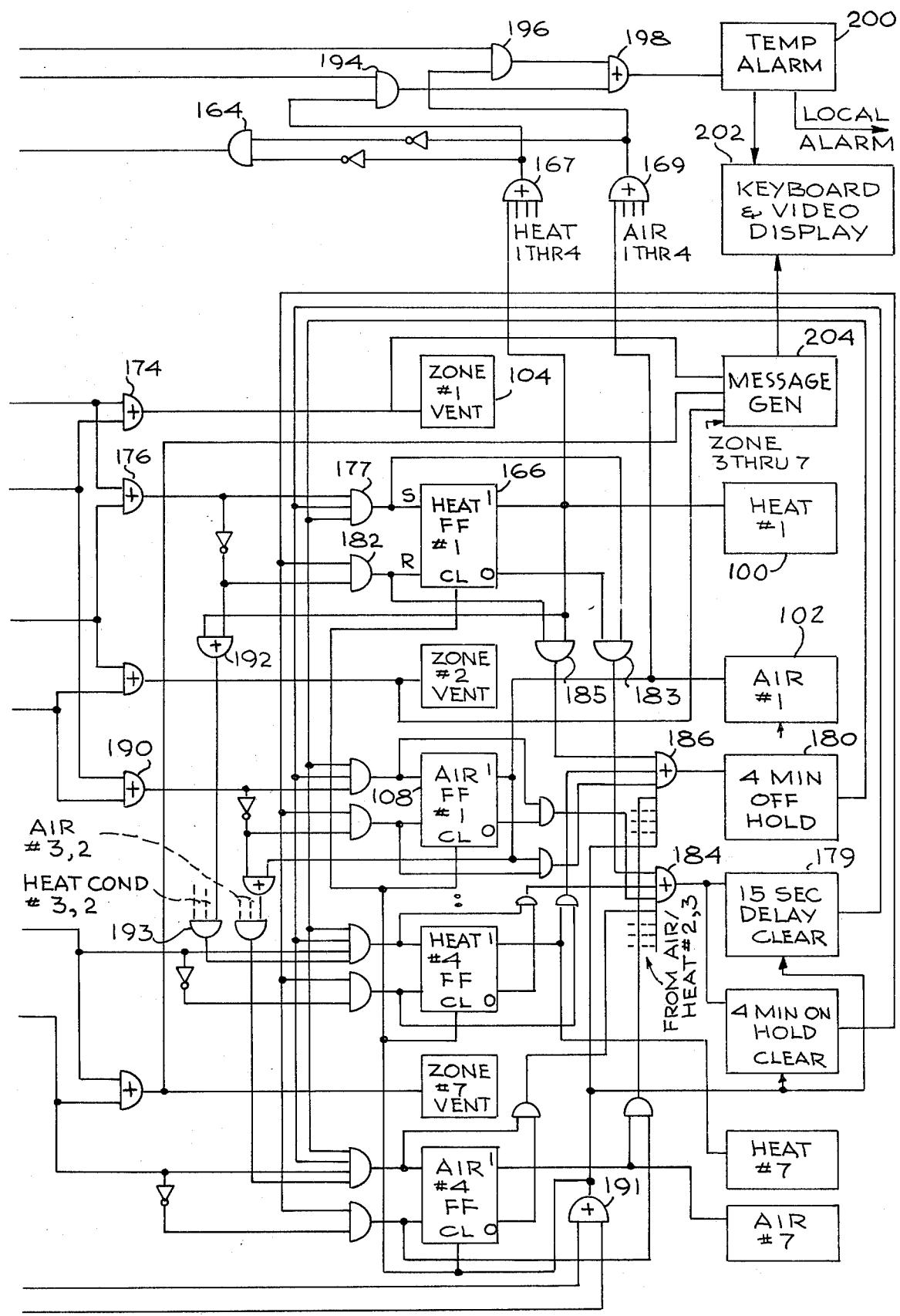

Prior to discussing the exemplary implementation of the heat/air condition subsystem illustrated in FIG. 3, the operation of the subsystem will be briefly described. Initially, it should be understood that the subsystem individually controls the temperature in multiple zones or areas of the residence. Each zone, within limits, can be set to and maintained at its own temperature level independently of the other zones. The subsystem is compatible with essentially any type of heat or air condition units, such as gas or electric. Likewise, the subsystem can be used with substantially any kind of distribution system such as a ducted forced air system or a hot water radiator system. Although a heat/air condition subsystem in accordance with the invention can be used with essentially any number of zones and any number heat and air condition units, in the exemplary embodiment to be explained herein in connection with FIG. 3, seven zones and four heat units and four air condition units have been assumed.

Each zone of the residence is provided with a triple setpoint zone thermostat. The lower setpoint is used to define an energy saving heating temperature. The middle setpoint is used to define a normal heating and air conditioning temperature and the upper setpoint is used to define an energy saving air conditioning temperature.

In addition to the multiple zone thermostats, a dual setpoint master thermostat is provided. The master thermostat selects either a heating or air conditioning mode of operation for the subsystem. That is, the subsystem is designed so as to prohibit the heat and air condition units from operating simultaneously. Thus, when the master thermostat determines that the temperature thereat exceeds its higher setpoint, it forces the subsystem into an air condition mode. On the other hand, when the master thermostat determines that the temperature thereat is below the lower setpoint, it forces the subsystem into a heat mode.

Although the master thermostat continually senses the temperature thereat, it is only able to change modes if the heat and air condition units have been shut off and all zone temperature requirements have been satisfied. As an example, if the home is in the heat mode and any zones are too cold, heat units will be turned on and these zones warmed. As the last zone reaches its temperature, all the heat units will be shut off. If as the day progresses, the home continues to warm up from the sun, the upper temperature setting of the master thermostat will be reached and the home will be put into the air condition mode. At this point, if there are any zones too hot, the air condition unit will be turned on.

A special temperature alarm detection capability is built into the heat/air condition subsystem. The alarm will be activated if the master thermostat temperature exceeds its upper setpoint while the heat unit is on or falls below its lower setpoint while the air condition unit is on. This may occur if any of the zone thermostats are set too high or too low causing excessive heating or air conditioning requirements. As an example, if zone 1 is set to 85° F. and the master is set to change to the air condition mode at 80° F., as zone 1 is heated, the excessively hot air will return to the master (preferably located near the heater return air duct) raising the surrounding temperature and causing the alarm to be activated. On activation of the temperature alarm, the video display is turned on and a local audible alarm is energized. The video display will identify which zones are currently demanding heating or cooling, thus suggesting to the user which zone thermostat may be improperly set.

In addition to the foregoing, means are provided for selectively defining an energy save mode of operation in each of the zones. The energy save mode of operation is normally under the control of a time-of-day-on/off controller but is also controlled by the priority shutdown subsystem. When a zone is in the energy save mode, only the upper and lower setpoints of the triple setpoint zone thermostat are monitored.

A control means is provided in each zone for selectively coupling the active one of the heat unit or air condition unit to the zone. More particularly, assuming a standard forced air home system, duct control valves are included in the ductwork to each zone. A control motor is associated with each duct control valve. As the zone reaches the desired temperature, the motor will be operated to close the duct valve, thus sealing off the zone. On the other hand of course, when the zone demands heating or cooling, the motor will be operated to open the duct valve to thus permit heated or cooled air to be delivered to that zone.

With the foregoing overview of the operation of the heat/air condition subsystem in mind, attention is now directed to FIG. 3 which illustrates an exemplary embodiment of that system.

Attention is now directed to FIG. 3 which illustrates an exemplary embodiment of the heat/air condition subsystem for controlling multiple heat units 100, multiple air condition units 102, and multiple zone duct vents 104. As was previously pointed out, it has been assumed that the system of FIG. 3 controls four heat units and four air condition units and seven zones, but of course is capable of controlling a greater number of each of these elements.

Figure 3A:
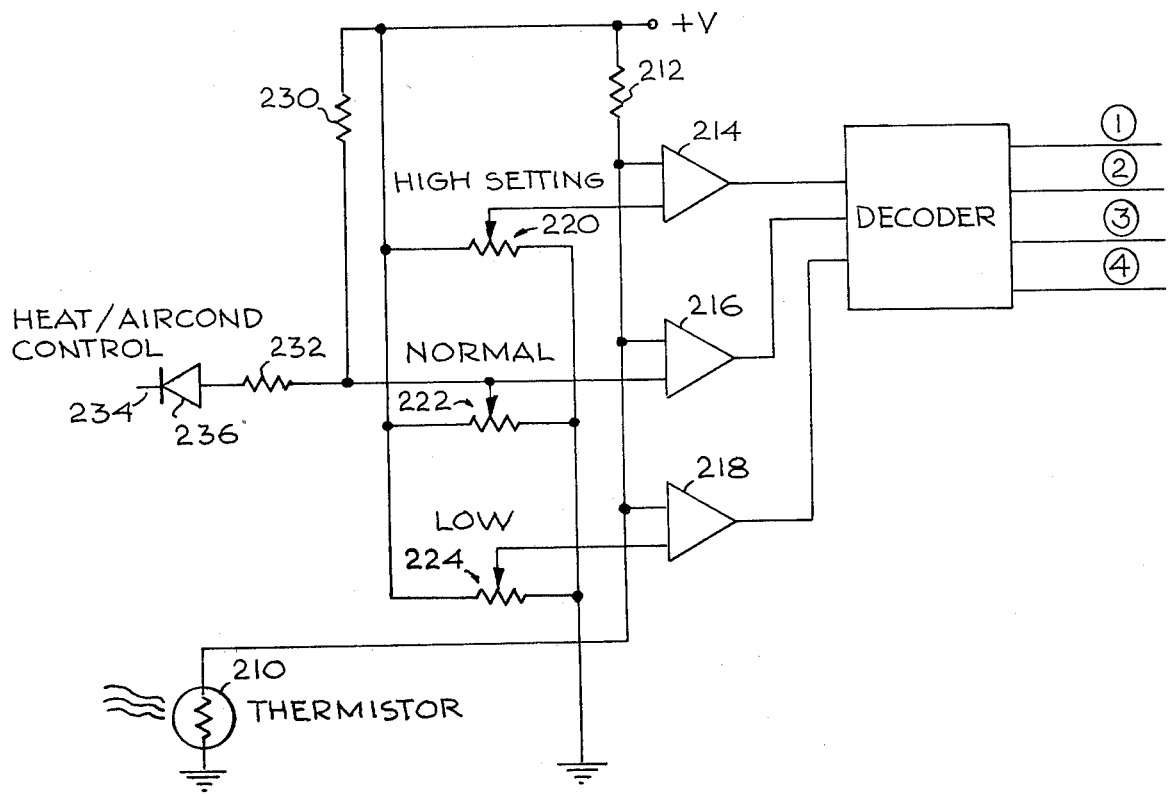
FIG. 3A is a diagram of a preferred zone thermostat useful in the subsystem of FIGS. 3(1) and 3(2)

As previously pointed out a different triple setpoint zone thermostat 110 is mounted in each of the zones to sense the temperature therein. Since all of the zone thermostats operate identically, detailed reference herein will only be made to zone thermostat 1 and its associated logic. Zone thermostat 110, to be discussed in greater detail in connection with FIG. 3A, is provided with four output terminals. A true logic level signal will be produced on one of the four output terminals depending upon which range the temperature sensed by the zone thermostat falls in. Thus, if zone thermostat 110 senses a temperature below its lower setpoint, zone thermostat output terminal 1 will be true. If the sensed temperature falls betweeen the lower and middle setpoints, output terminal 2 will be true. If the sensed temperature is between the middle and upper setpoints, output terminal 3 will be true. If the sensed temperature is higher than the higher setpoint, output terminal 4 will be true. The four output terminals of the zone thermostats 110 are coupled to the inputs of AND gates 120, 122, 124 and 126 respectively. And gates 120 and 126 are enabled during an energy save mode of operation. And gates 122 and 124 are enabled during a normal mode of operation. More particularly, the energy save or normal mode of operation is defined by an energy save flip flop 130 which is controlled primarily in response to a time-of-day-on/off controller 132. However, as will be discussed hereinafter, the energy save flip flop 130 can also be controlled in response to a priority shutdown signal 134 applied thereto. The priority shutdown signal can be generated by the priority shutdown subsystem to be discussed hereinafter in connection with FIG. 6. In order to selectively place some zones in the energy save mode while having others in the normal mode, multiple energy save flip flops 130 are provided, each dedicated to one or more predetermined zones. Preferably, a different energy save flip flop 130 is provided for each different heat unit 100.

A scan counter 140 is provided to define seven distinct time slots T1 through T7. A different zone thermostat is sampled during each time slot. Thus, the outputs of zone thermostat 1 are sampled during time slot T1 and accordingly an input T1 is coupled to all the gates 120, 122, 124 and 126. Similarly, an input T2 is coupled to the input of all of the gates associated with the output terminals of zone thermostat 2.

The outputs of gates 120, 122, 124, and 126 are applied to the inputs of gates 142, 144, 146, and 148. A second input to each of the gates 142, 144, 146, and 148 is derived from a mode control flip flop 150 which defines either a heat or air condition mode of operation. The mode control flip flop 150 is controlled primarily by the previously mentioned master thermostat 154. As mentioned, the master thermostat is a dual setpoint device and has two output terminals 156 and 158. When the master thermostat senses a temperature below its lower setpoint, it provides a true logic signal on output terminal 156. On the other hand, when the master thermostat senses a temperature greater than its upper setpoint, it produces a true logic level at output terminal 158. Output terminals 156 and 158 are respectively coupled through AND gates 160 and 162 to the set and reset input terminals of the mode control flip flop 150. A second input to the gates 160 and 162 is derived from the output of gate 164 which is responsive to the states of heat control flip flops 166 and air condition control flip flops 168, as represented by the outputs of OR gates 167 and 169. Briefly, four flip flops 166 respectively control the activation of the four heat units 100. Similarly the four flip flops 168 respectively control the activation of the four air condition units 102. The gate 164 which is responsive to the state of the flip flops 166 and 168 is provided to prevent the mode control flip flop 150 from changing state while any of the heat units or air condition units are on.

The air condition output terminal of mode control flip flop 150 is coupled to the input of gates 146 and 148. The heat output terminal of flip flop 150 is connected to the inputs of gates 142 and 144. The outputs of gates 142 and 144 are applied to the input of OR gate 170. Similarly the output of gates 146 and 148 are applied to the inputs of OR gate 172.

Prior to continuing with a description of the implementation represented in FIG. 3, it would be helpful to consider a typical example. Let it be assumed that the master thermostat 154 last set the mode control flip flop 150 to the heat mode in response to the sensed temperature being below the lower setpoint of the master thermostat. Let it also be assumed that zone 1 thermostat senses a temperature below its middle setpoint but above its lower setpoint, meaning that its terminal 2 will be true. With this set of conditions, it should be apparent that zone 1 is demanding warm air. Warm air will be delivered to zone 1 as a consequence of gate 122 providing a true output during time slot T1. This will in turn cause AND gate 144 and OR gate 170 to provide true outputs. The output of OR gate 170 is coupled through OR gate 174 to open zone vent 104. Additionally, the output of OR gate 170 is coupled through OR gate 176 to the input of AND gate 177 whose output is connected to the set input of heat control flip flop 1. The AND gate 177 is additionally responsive to the state of a fifteen second delay timer 179 and a four minute delay timer 180.

The function of the timer 179 is to avoid power line surges by assuring at least a fifteen second interval between heat units (or air condition units) coming on. The function of the timer 180 is to prevent excessive cycling by assuring that once a heat unit (or air condition unit) is turned off, none of the units can be turned on for at least four minutes. A further four minute delay timer 181 is provided also to prevent excessive cycling by assuring that once a unit is turned on, it remains on for at least four minutes.

Continuing with the aforementioned example, assuming that no unit has been turned off for at least four minutes, the output of timer 180 will be true and the true output of gate 176 will set heat flip flop 1. Heat flip flop 1 can be reset via gate 182 only if the gate 176 output goes false and timer 181 supplies a true output. As long as heat flip flop 1 is set, its associated heat unit 1 will be on.

When heat flip flop 1 is first set, it will supply a pulse via gate 183 to activate timer 182 via gate 184 to initiate the four minute hold-on interval. At the end of that interval, heat flip flop 1 will be reset via gate 182 if the output of gate 176 is no longer true. When heat flip flop 1 is first reset, it will supply a pulse via gate 185 to activate time 180 via gate 186 to initiate the four minute hold-off interval.

It should be noted that the output of gate 184 is also connected to the input of the timer 179 so that the aforementioned fifteen second interval is initiated whenever the four minute hold-on interval is initiated. The output of timer 179 is connected as an input to the AND gates 177 coupled to the set inputs of all of the heat control flip flops 166 and air condition flip flops 168 to thus prevent the setting of any of these control flip flops during the fifteen second interval.

As a further example, now assume that the mode control flip flop 150 is in the air condition mode and that zone thermostat 1 output terminal 4 is true meaning that the temperature sensed by the zone thermostat exceeds its higher setpoint. Also assume that the zone 1 energy save flip flop 130 defines the energy save mode. Under the circumstances, gate 126 will be enabled during time slot T1.

As a consequence of gate 126 providing a true output signal during the air condition mode as defined by the mode control flip flop 150, AND gate 148 and OR gate 172 will provide a true output signal. OR gate 172 will in turn open the zone vent 104 via gate 174 to permit delivery of air to zone 1. Additionally, OR gate 172 will set the air condition flip flop 168 via OR gate 190. The output of OR gate 190 will set the timer 181 to initiate a four minute interval in the same manner as has been described for OR gate 176. The purpose of introducing the four minute interval is to prevent frequent cycling of the heat and air condition units and to assure that once activated, the unit cannot be turned off until four minutes after the last unit has been turned on. This prevents rapid cycling of air conditioners which is a potential source of damage. The only exception of this turn off procedure is a power loss to the home or an emergency shutdown condition sensed by the security subsystem. In both cases, OR gate 191 will be enabled to clear all control flip flops and timers 179 and 181 to thus cause all units to shut down immediately. The turn on cycle will always be delayed four minutes by timer 180 from the time when the last unit was turned off or from when the power is restored. Thus, rapid cycling is prevented under all conditions including faulty power.

From what has been said thus far, it will be recalled that the exemplary subsystem employs multiple heat units and air condition units. Each unit is controlled by one or more predetermined zone thermostats. Thus, it has been assured that zones 1 and 2 control heat/air condition units 1, zones 3 and 4 control heat/air condition units 2, zones 5 and 6 control heat/air condition units 3, and zone 7 controls heat/air condition units 4. In order to prevent two units from coming on simultaneously in the event their respective zones generate a demand concurrently, logic means are provided to determine a priority and enable the lower numbered unit to turn on while preventing the higher numbered unit from turning on within fifteen seconds thereof. Briefly, this priority determination is accomplished by requiring that for each control flip flop to be set, all lower numbered control flip flops must either be true or be associated with nondemanding zones.

In order to implement the foregoing criteria, an OR gate 192 is provided for each control flip flop to sense the state of the control flip flop and the output of gate 176 which indicates whether or not the associated zones are demanding heating or cooling. Gate 192 associated with heat flip flop 1 will provide a true output if (1) the output of gate 176 is false meaning that neither zone 1 nor 2 is demanding, or (2) if heat flip flop 1 is true. The output of gate 192 associated with heat flip flop 1 is applied to the inputs of AND gates 193 coupled to the heat flip flops 2, 3, and 4. Similarly, the output of gate 192 associated with heat flip flop 2 is applied to gate 193 coupled to heat flip flops 3 and 4 and the output of gate 192 associated with heat flip flop 3 is applied to gate 193 associated with heat flip flop 4. Thus, each gate 193 will prevent its heat flip flop from being set unless all lower numbered heat flip flops are true or their associated zones are nondemanding.

Alarm means are provided for generating a temperature alarm to detect if the master thermostat temperature exceeds its higher setpoint while a heat unit is on or falls below its lower setpoint while an air condition unit is on. More particularly, AND gates 194 and 196 are provided which respectively have as inputs the output terminals 156 and 158 of the master thermostat 154. AND gate 194 has its second input connected to the output of OR gate 169 which senses the state of all the air condition control flip flops 168. Similarly, gate 196 has its second input connected to the output of OR gate 167 which senses the state of all of the heat control flip flops 166.

Now assume the condition in which the master thermostat 154 indicates that the temperature exceeds its higher setpoint. Also assume that a heat control flip flop 166 is set meaning that AND gate 196 will apply a true output via OR gate 198 to a temperature alarm circuit 200. Similarly, AND gate 194 will provide a true output to the temperature alarm circuit 200 if the master thermostat senses a temperature below its low setpoint while an air condition flip flop 168 is set. The alarm circuit 200 will generate a local alarm and in addition will apply power to the keyboard and video display device 202. A ROM coded serial output message generator 204 responds to the outputs of gates 174 to sense which of the normally closed zone vents is open. The message generator 204 will in turn provide an alphanumerical character signal stream to the video display 202 causing it to present a text message identifying the zone to which air is being supplied.

Attention is now directed to FIG. 3A which illustrates a preferred embodiment of a triple setpoint zone thermostat appropriate for use in the heat/air condition subsystem of FIG. 3. The zone thermostat includes a temperature sensitive thermistor 210 connected in series with a resistor 212 between ground and a source of positive potential. Voltage comparators 214, 216, and 218 each have one input connected to the junction between the thermistor 210 and 212. The second inputs to the voltage comparators are respectively connected to the wiper contacts of three setpoint potentiometers 220, 222, and 224. Each set point potentiometer includes a resistor connected between the source of positive potential and ground. The three setpoint potentiometer resistors are connected in parallel. Thus, by moving the wiper contact along the resistor of each potentiometer, the user is able to establish a desired voltage or temperature setting on the lower input terminal of each of the comparators 214, 216, and 218. As the temperature sensed by the thermistor 210 varies, its resistance will of course change so as to thereby modify the voltage applied to the upper terminals of the comparators. Thus, each comparator is able to compare the voltage at the junction between thermister 210 and resistor 212 with the voltage set in by the position of the potentiometer wiper contact connected thereto. The outputs of comparators 214, 216 and 218 are connected to a decoder having the four output terminals illustrated and previously discussed in connection with the zone thermostat 110 of FIG. 3.

In accordance with a preferred aspect of the zone thermostat illustrated in FIG. 3A, means are provided for offsetting the middle or normal setpoint when the air condition mode is defined. As an example, if the zone thermostat middle setpoint has been selected for 70° F. in the heat mode, the air condition mode would automatically inject a certain offset, typically a 6° differential, such that the middle setpoint during the air condition mode is 76° F. This differential is injected by providing a voltage divider formed by resistors 230 and 232 and activated by a low level air condition mode control signal applied to the input terminal 234 and connected to diode 236. The effect of introducing this offset is to provide an automatic setback for the air condition mode as contrasted with the heat mode. That is, assuming operation in the normal nonenergy save mode when the middle setpoint of the zone thermostat is used by the subsystem, the heat unit will be turned on only when the zone temperature falls below 70° F. and the air condition unit will be turned on only when the zone temperature exceeds 76° F., using the previously assumed setting of the wiper arm on potentiometer 222.

CONTROLLED DEVICE SUBSYSTEM

Figure 4:
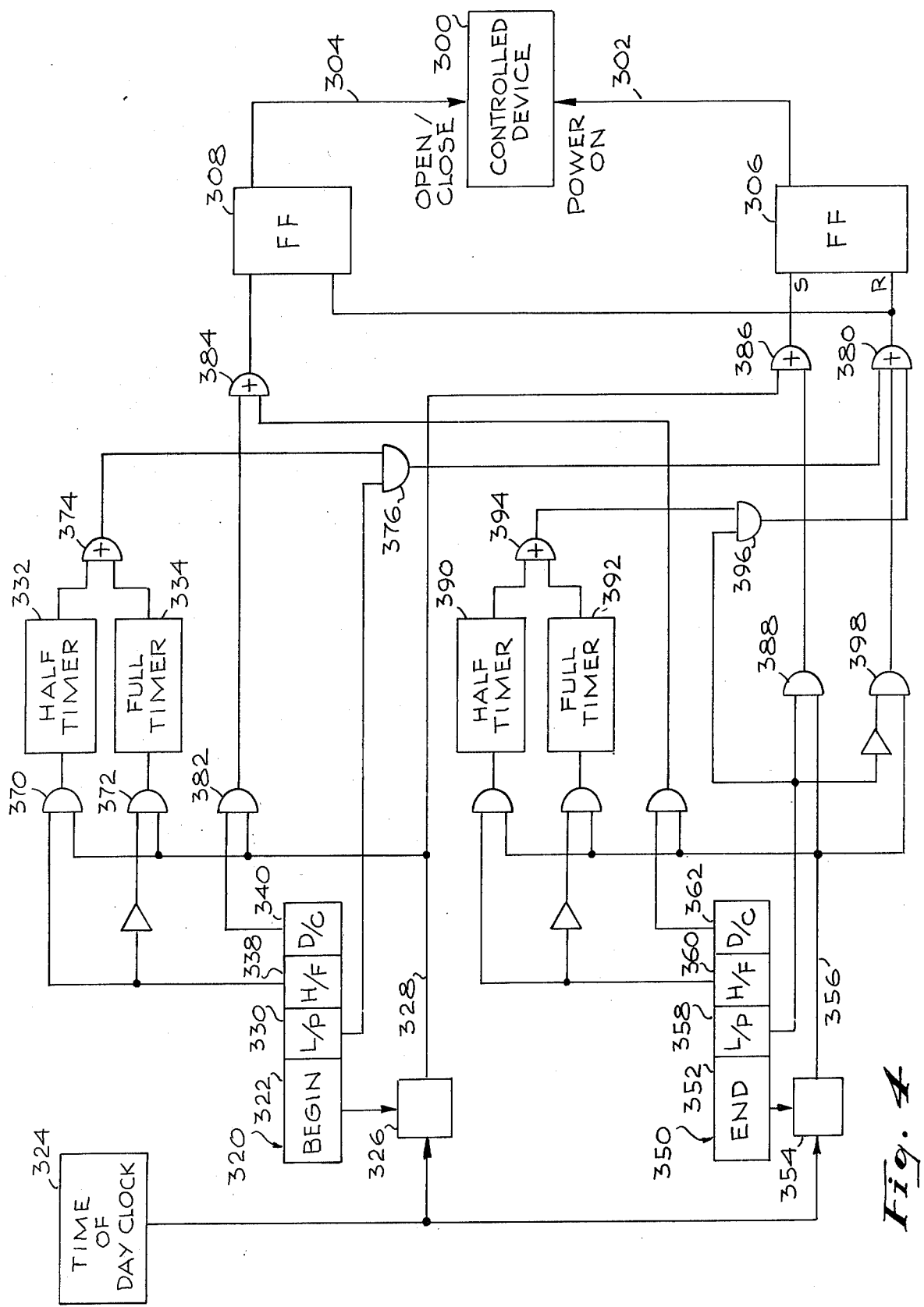
FIG. 4 is a block diagram of a controlled device subsystem in accordance with the present invention.

Prior to considering the detailed implementation of the controlled device subsystem illustrated in FIG. 4, the overall utility and operation will be briefly discussed. Initially, it is pointed out that the purpose of the controlled device subsystem is to control the energization of an output device. Typically, each output device to be controlled can be categorized as either being one which is to be energized for a relatively short period of time, such as a sun shade or drape motor, or one which is to be energized for a relatively long period of time such as an electrical outlet which may control a security light, for example. The controlled device subsystem essentially operates in response to a time-of-day clock which is compared with registers in the subsystem which store information as to when each control device is to be turned on or off. Additionally, each register preferably stores information identifying whether the device is to be operated in a pulse mode, which would be applicable to devices such as motors to be energized for a relatively short period or a level mode which is applicable to devices to be energized for a considerably longer period.

In the case of a sun shade or drape motor, it may be desirable to energize the motor to open or close the sun shade either fully or partially. As will be seen hereinafter, associated with each controlled device is a full timer unit and half timer unit which are preset to define a time duration corresponding to the duration it takes to open or close the sun shade fully or partially. The information stored in the register associated with the controlled device indicates which of the timers should be selected. Additionally, the information stored in the register identifies the direction of motor movement, that is in the case of a sun shade motor, whether the sun shade should be opened or closed. In accordance with a particularly significant feature of the controlled device subsystem, a control circuit, to be discussed hereinafter, is disclosed in FIG. 5 which enables the heat/air condition subsystem to overide the preset clock control to assure that sun shades are not opened when the air conditioning mode is defined by the heat/air condition subsystem. Moreover, the control circuit of FIG. 5 includes sensor means responsive to ambient light levels for sensing the available sunlight proximate to the sun shade to determine the appropriateness of permitting the air condition mode control to overide the clock control associated with the sun shade motor.

Attention is now specifically directed to FIG. 4 which illustrates the controlled device 300 having a first power on input terminal 302 and a second open/close input terminal 304. Input terminal 302 is controlled by the true output terminal of flip flop 306 such that when flip flop 306 is true power is supplied to the controlled device 300. The true output terminal of flip flop 308 controls the input terminal 304 such that when flip flop 308 is true, the controlled device 300 will be opened.

The controlled device subsystem utilizes one or more registers to store information to identify a time of day when an action with respect to the controlled device 300 is to occur. Initially consider register 320 which in a first field 322 stores a "begin" time. The output of the "begin" time stored in field 322 is compared with the output of a time-of-day clock 324 by comparator 326. When a match is indicated, comparator 326 will provide a true output signal on line 328.

The register 320 additionally stores information identifying the action to be taken at the "begin" time. Thus, a single bit in field 330 indicates whether the level or pulse mode is to be defined. As previously mentioned, the pulse mode is used to control devices such as motors which are intended to be turned on for a rather limited duration. When the pulse mode is defined, control over the flip flop 306 is exercised by timer circuits 332 and 334. In order to understand the function of the timers 332 and 334, assume, as an example, that in order to fully close a sun shade it is necessary to energize its control motor for sixty seconds. In such a situation, the full timer 334 will be preset to a sixty second interval. Assume however that during a certain part of the day it is desired to only partially open or close the sun shade. Thus, a lesser interval, e.g. thirty seconds, can be preset into the half timer 332. Although for convenience the timer 332 has been referred to as a half timer, it should be understood that it need not define exactly half of the full interval but rather can be set to any arbitrary interval.

The particular one of the timers 332 and 334 selected when in the pulse mode is defined by the bit stored in field 338 of the register 320. Field 340 of register 320 defines the direction in which the controlled device is to be moved, i.e. open or close.

Also associated with each controlled device is a second register 350 which includes a field 352 defining an "end" time. The contents of field 352 are compared with the output of the time-of-day clock 324 by a comparator 354 which provides a true output signal on line 356 when a match is recognized. Register 350 includes fields 358, 360 and 362, corresponding to the previously discussed fields 330, 338 and 340 of register 320, for defining the action to occur at the "end" time.

Although only one "begin" time register 320 and one "end" time register 350 have been illustrated in FIG. 4, it should be understood that additional registers could be provided for the same controlled device 300 where it may be desired to begin and end several operations of the controlled device within one cycle of the time-of-day clock 324.

The single bit stored in field 320 of the register 320 controls which of gates 370 and 372 is enabled in response to a match signal provided by comparator 326. If gate 370 is enabled, then the half timer 332 is set. If gate 372 is enabled, then the full timer 334 is set. Regardless, when the enabled timer times out, it will produce a true output pulse which will be passed by OR gate 374 to the input of AND gate 376. Assuming that the pulse mode has been defined by field 330, AND gate 376 will provide a true output to OR gate 380 to reset the power control flip flop 306.

The bit contained in field 340 is coupled to the input of AND gate 382 which is enabled by the match signal provided by comparator 326. If the field 340 indicates that the controlled device should be open, then the flip flop 308 will be set by OR gate 384 whose input is coupled to the output of AND gate 382.

The match output of comparator 326, in addition to enabling the aforementioned gates 370, 372 and 382, sets the power control flip flop 306 via OR gate 386. It will be recalled that in the pulse mode, the power control flip flop 306 is reset by OR gate 380 when the selected timer 332 or 334 times out.

When comparator 354 associated with the "end" time register 350 produces a match signal on line 356, it produces essentially the same sequence, if the pulse mode is defined, as has been described for the pulse mode associated with the "begin" time register 320. That is, when the match signal provided by comparator 354 is generated, if the pulse mode is defined by field 358, then AND gate 388 will be enabled to set the power control flip flop 306. Moreover, either the half timer 390 or the full timer 392 will be activated, depending upon the bit within field 360. When the selected timer 390 or 392 times out, a true pulse will be passed via OR gate 394 and AND gate 396 to the OR gate 380 to reset the power control flip flop 306. The direction of motor control is defined by the bit within field 362 of the "end" time register 350.

Thus far we have primarily discussed the pulse mode. If the "begin" time register 320 defines the level mode instead of the pulse mode, then the power control flip flop 306 would not have been reset by the timers 332 or 334. Rather, it would have remained set until the comparator 354 associated with the "end" time register 350 indicates a match. The match signal developed on line 356 will enable gate 398 in the level mode to reset power control flip flop 306.

Figure 5:
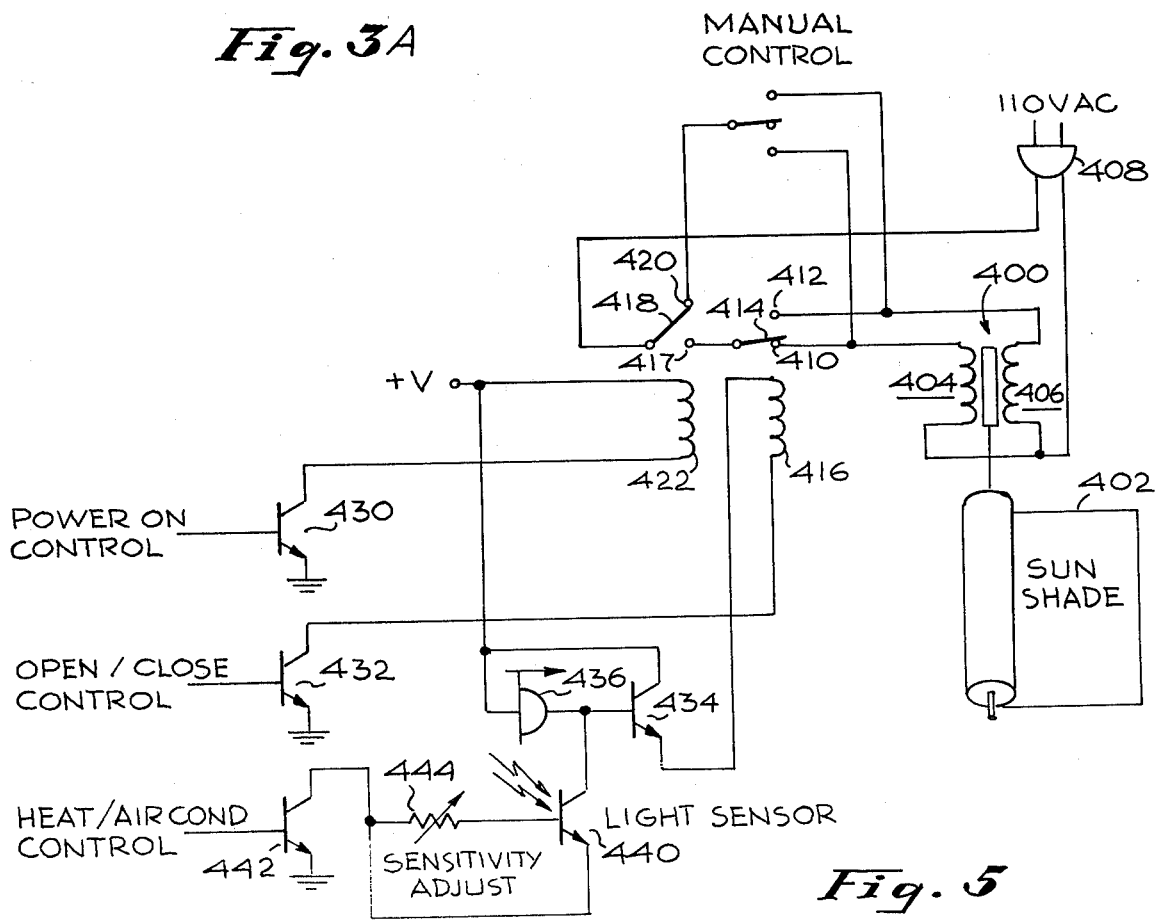
FIG. 5 is a schematic diagram of a particular control circuit responsive to the heat/air condition subsystem of FIGS. 3(1) and 3(2) and the controlled device subsystem of FIG. 4.

Attention is now directed to FIG. 5 which illustrates a preferred embodiment of a controlled device 300 to be employed in the subsystem of FIG. 4.

FIG. 5 illustrates a bidirectional motor 400 for controlling sun shade 402. The motor includes a coil 404 which when energized will be assumed to turn the motor in a direction to close the sun shade 402. Additionally, the motor 400 includes a coil 406 which when energized will be assumed to open the sun shade 402. Note that one terminal of each coil 404 and 406 is connected to one side of a 110 volt A/C power source 408. The second terminals of coils 404 and 406 are repsectively connected to terminals 410 and 412. A relay switch contact 414 normally contacts terminal 410. When relay coil 416 is energized, contact 414 moves into engagement with terminal 412. Contact 414 is in turn connected to terminal 416. Relay switch contact 418 normally engages terminal 420 but when energized by relay coil 422 moves into contact with terminal 417. Contact 418 is connected to the second side of the 110 volt power source 408. The relay coil 422 is connected between a positive direct current voltage and an NPN transistor controlled by the power control flip flop 306 of FIG. 4. That is, when the flip flop 306 is set, it forward biases NPN transistor 430 to energize relay coil 422 to move contact 418 into engagement with terminal 417 and thus energize either coil 404 or coil 406 of the motor 400 depending upon the position of the relay switch contact 414. The contact 414 is controlled by relay coil 416, one terminal of which is connected through NPN transistor 432 to ground and the other terminal of which is connected through NPN transistor 434 to the source of positive direct current voltage. The transistor 432 is forward biased when flip flop 308 of FIG. 4 is set to thus energize coil 416 to move contact 414 into engagement with terminal 412 to thus energize coil 406 and open the sun shade 402.

The base of the NPN transistor 434 is connected through a current diode 436 to the source of positive direct current potential. Additionally, the base is connected through a semiconductor light sensor 440 and NPN transistor 442 to ground. Transistor 442 is controlled by the heat/air condition mode control flip flop 150 of FIG. 3. When the heat mode is defined by the heat/air condition subsystem, transistor 442 is held off and thus the path through light sensor 440 is removed permitting control of the relay coil 416 to be under the control of the open/close transistor 432. On the other hand, when the heat/air condition subsystem is in the air condition mode, the NPN transistor 442 will conduct thus forward biasing the semiconductor light sensor 440. The light sensor 440 is mounted proximate to the sun shade to detect the level of ambient sunlight thereat. Assume initially that the light level is high. With transistor 442 forward biased and with the light sensor 440 conducting heavily due to the high ambient light level, transistor 434 will be held off thus preventing energization of the relay coil 416 meaning that the sun shade will be prevented from opening. Thus, the inclusion of the circuitry comprising transistor 442 and light sensor 440 prevents the sun shade from opening if the air conditioner mode is defined and a high ambient light level exists proximate to the sun shade, regardless of the preset times defined by the time registers 320 and 350 of FIG. 4. Thus, it should be seen that this action of defeating energization of the relay coil 416 prevents increasing the heat load when the air condition mode is defined. This action of course minimizes energy consumption. On the other hand, even with the air condition mode defined, if the light sensor 440 senses a low ambient light level, then the base of transistor 434 will not be pulled down sufficiently to prevent conduction through relay coil 416. The variable resistor 444 connected to the base of the semiconductor light sensor 440 enables the circuit to be finely adjusted so as to establish the desired light level at which the opening of the sun shade is prevented.

PRIORITY SHUTDOWN SUBSYSTEM

Figure 6:
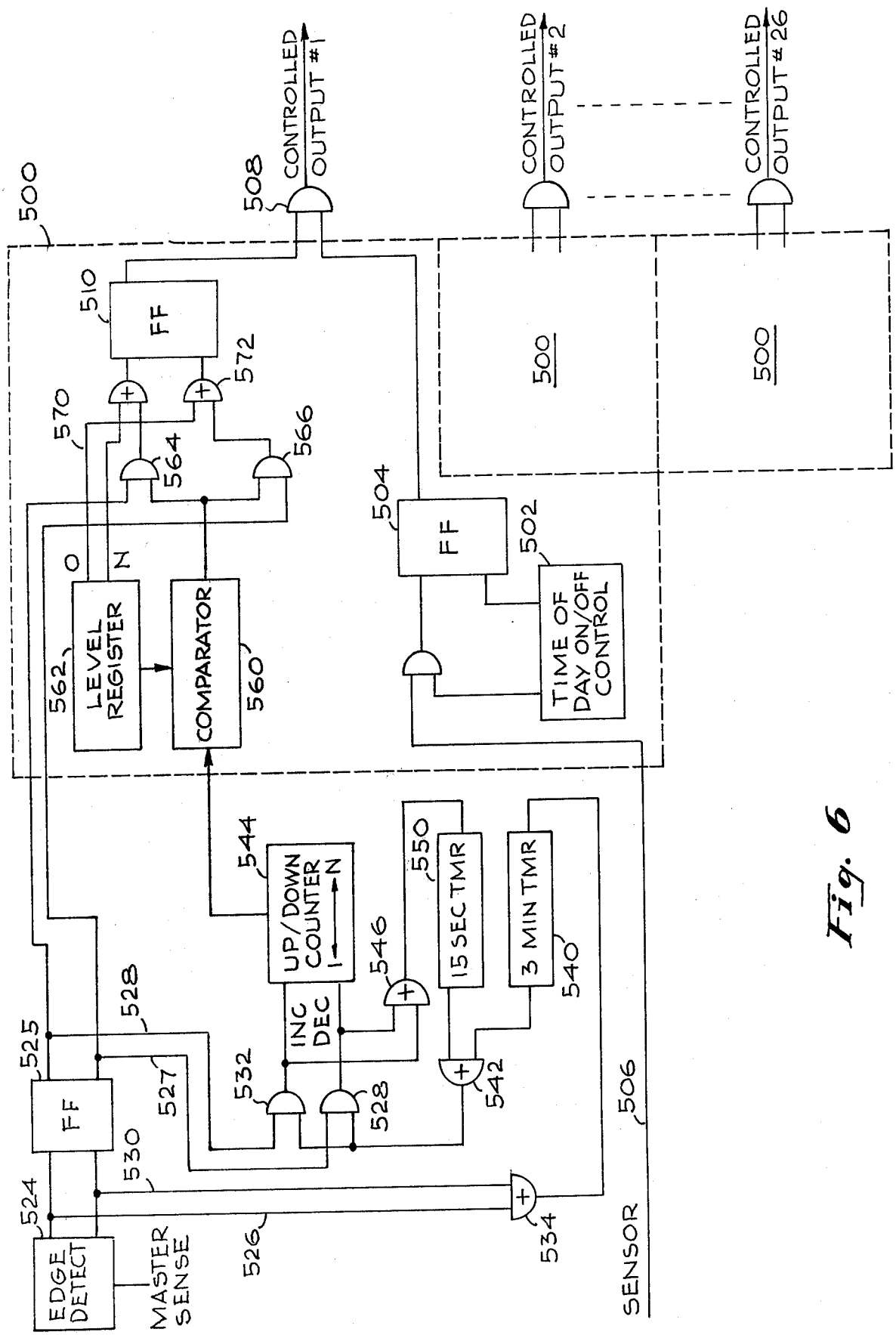
FIG. 6 is a block diagram of a priority shutdown subsystem in accordance with the present invention.

FIG. 6 illustrates an exemplary embodiment of a priority shutdown subsystem in accordance with the present invention. Prior to considering the details of the subsystem, its function and operation will first be explained.

The primary purpose of the priority shutdown subsystem illustrated in FIG. 6 is to limit the homeowners cost of energy, particularly those homeowners on a demand rate meter. The term "demand rate meter" refers to a system of billing used by many utility companies throughout the country to discourage consumption of electrical energy in large bursts for short periods of time. The demand rate meter system leads to a lower charge for the consumption of a unit of electrical energy in smooth levels. Typically, higher charges are assessed if peak usage bursts significantly exceed average usage. The purpose of the priority shutdown subsystem of FIG. 6 is to turn off various controlled outputs in an ordered sequence depending upon the priorities preassigned to each controlled output. Associated with each controlled output is a level register which stores the preassigned priority level for that controlled output. The level register is contained within a control circuit 500 associated with each controlled output. Since all the control circuits 500 are identical except for the information stored therein, only the control circuit 500 connected to controlled output 1 in FIG. 6 will be discussed in detail.

Initially, associated with each controlled output is a time-of-day-on/off controller 502. This controller can comprise a time-of-day clock and multiple "begin" and "end" time registers of the type discussed in connection with FIG. 4. The time-of-day-on/off controller 502 is capable of setting and resetting flip flop 504 either totally under its own control or in conjunction with a signal provided by a sensor on input line 506. Thus for example, if the controlled output 1 were a Solenoid controlling a water valve in the lawn sprinkler system, it could be set to open at certain times during a day or week, except that it would be prevented from coming on if a moisture sensor in the lawn indicated via line 506 that the lawn was already sufficiently wet. The true output of flip flop 504 is connected to the input of an AND gate 508 which controls the controlled output 1. The second input to gate 508 is derived from a flip flop 510. It will be assumed that so long as flip flop 510 is set, the gate 508 is controlled totally by the time-of-day controller 502 and the sensor signal 506. However, the priority shutdown subsystem can under appropriate circumstances reset flip flop 510 to thus essentially take away control of the controlled output 1 from the time-of-day controller 502.

The subsystem of FIG. 6 is responsive to a signal on a master sensor input line 520. An open signal on this line will initiate a shut down sequence. A closed signal will reverse the procedure, sequentially restoring the controlled outputs to the original condition. A master sensor input line 520 in connected to an edge detect flip flop circuit 524. Thus, the circuit 524 is able to indicate and hold the indication of whether the master sensor input 520 most recently closed or opened. The circuit 524 is provided with two output terminals. If a shutdown precedure is to occur, circuit 24 will provide a true output signal on line 526 connected to the input of gate 528. If a restore sequence is to occur, the edge detector 524 will provide a true signal on line 530 coupled to the input of AND gate 532. The lines 526 and 530 are connected to the input of a common OR gate 534 whose output is connected to a three minute timer 540. When the three minute timer 540 times out, it provides a true output pulse via OR gate 542 to the inputs of AND gates 528 and 532. The outputs of gates 528 and 532 are respectively connected to the decrementing and incrementing input terminals of an up/down counter 544 which is capable of counting bidirectionally from 1 to N. The outputs of gates 528 and 532 are connected through an OR gate 546 to the input of a fifteen second timer 550. When the timer 550 times out, it will provide a true pulse via gate 542 again to the inputs of gate 528 and 532.

Assume now that the level on the master input sensor line 520 falls to thus command a shutdown sequence or rises to effect a restore sequence. In either event, the three minute timer 540 will be energized and during this three minute interval no action will take place. At the end of the three minute interval, it will begin to sequence the counter 544 either up or down depending upon the condition detected by the edge detector circuit 524 at fifteen second intervals as defined by the timer 550. The output of the counter 544 will be compared in comparator 560 with the contents of a priority level register 562 contained within the circuit 500 dedicated to the controlled output 1. When the count in counter 544 matches the contents of the level register 562, the comparator 560 will provide a match signal on line 562 connected to the input of AND gates 564 and 566. The outputs of gates 564 and 566 are connected to the set and reset input terminals respectively of flip flop 510.

Assume that we are in a priority shutdown sequence and that the counter 544 is being decremented. The output of the counter 544 is connected in parallel to the comparators of all of the circuits 500 connected to all of the controlled outputs. As the counter 544 reaches each count, all of the comparators 560 will compare the count within the counter 544 with the level stored in the priority level register within the circuit 500. If a match is detected, then the gate 566 is enabled to reset the flip flop 510 thus shutting off the controlled output 1. On the other hand, if a restore sequence is being performed, a match between the counter contents and level register contents will enable gate 564 to switch the flip flop 510 back to a set state to thereby restore control of the controlled output to the time-of-day-on/off controller 502.

In a typical system, twenty different priority levels can be defined. At least two levels, assumed to be zero and N, are reserved for special situations. As an example, a zero priority level will permanently hold a controlled device off until a different number is assigned to the priority level register. More particularly, note that if the priority level register 562 stores a zero, then output terminal 570 associated therewith becomes true to reset the flip flop 510 via gate 572. If the controlled output 1 comprises a heat/air condition zone, it is not shutdown by rather is forced into an energy saving mode. Zones are never shutdown by the priority shutdown system of FIG. 6 but rather may be forced into the energy saving mode. This allows heat and air conditioner units to be shut down normally only if the home temperatures are within reasonable energy saving limits. Timers, however, may be shut down by the priority shut down system and thus, any items controlled by timers such as swimming pool pumps, lights, appliances, etc. will be turned off in an energy over demand situation.

In addition to the special priority level of zero, a special priority level of N is reserved to assure that the associated controlled output is maintained on regardless of the priority shutdown sequence. Thus, if the priority level register 562 stores a priority level N, the flip flop 510 will remain set via OR gate 574 regardless of the action of the priority shutdown subsystem.

A system in accordance with the invention has thus far been described in terms of its individual subsystems. In a preferred embodiment however, the individual subsystems will be controlled by a common controller and the subsystems will preferably time share many common elements. In its simplest form, the controller will merely activate the previously disclosed subsystems in sequence. In another alternative embodiment of the invention, the controller comprises a microprocessor and each of the subsystems is implemented by a routine, preferably stored in firmware, executed by the microprocessor.

Figure 7:
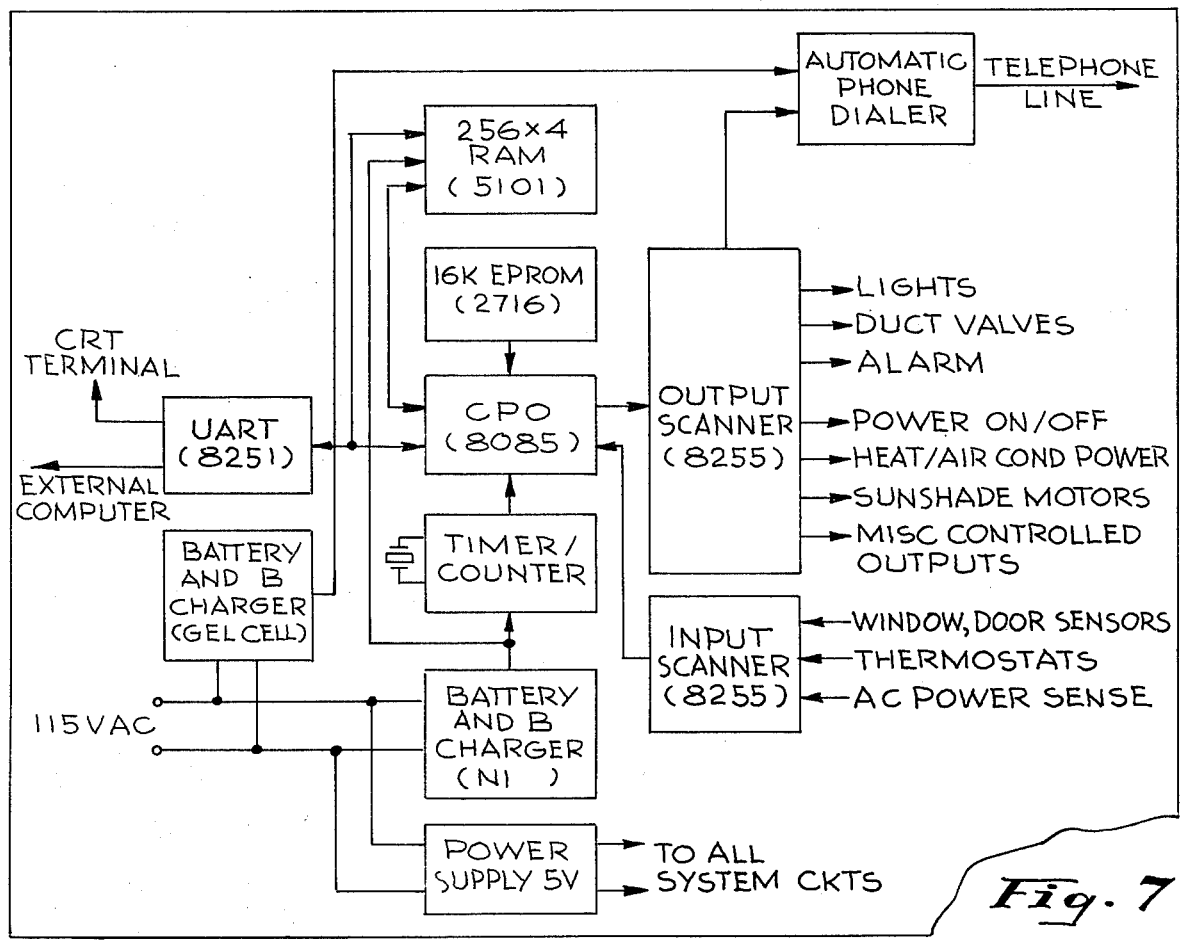
FIG. 7 is a block diagram of an alternative embodiment of the present invention utilizing a programmed microprocessor to implement the aforementioned subsystems.

FIG. 7 illustrates a block diagram of a preferred microprocessor based implementation of a system in accordance with the invention, utilizing an Intel 8085 as the central processing unit. An input scanner (preferably Intel 8085) is coupled to the CPU bus to supply the various previously discussed sensor and thermostat inputs thereto. The CPU is controlled by a program stored in a read only memory (2716). Variable data is stored in random access memory (5101) also connected to the bus of the CPU. The CPU in turn communicates with an output scanner (8255) via the bus to control the previously discussed controlled devices, heat units, air condition units, etc. A crystal controlled timer/counter is provided to indicate time-of-day to the CPU. A univeral asynchronons receive transmit device (UART 8251) is preferably provided to interface to the keyboard and visual display and to an optional external computer. A battery operated power supply with charger is preferably provided to maintain the system operable through power loss situations.

From the foregoing, it should now be recognized that a system for residential use has been disclosed herein capable of monitoring various fire and intrusion conditions and controlling various alarm, heat and air condition units, and other devices to achieve a safer and more energy efficient home.

Although an exemplary and preferred embodiment has been disclosed herein, it is recognized that variations will occur to those skilled in the art, falling within the scope of the appended claims.

What is claimed is:

1. A system for use in combination with a residence having at least first and second zones and at least one actuable heat unit and one actuable air condition unit for respectively warming and cooling the air in said zones, said system comprising:

master thermostat means including temperature sensing means and means for defining an air condition mode when the temperature sensed by said sensing means is above a first selectable level and a heat mode when the temperature sensed by said sensing means is below a second selectable level;

a first zone thermostat means mounted in said first zone including temperature sensing means for indicating whether the temperature sensed thereby is in a first range below a first selectable level or in a second range between said first selectable level and a second selectable level or in a third range between said second selectable level and a third selectable level or in a fourth range above said third selectable level;

a second zone thermostat means mounted in said second zone including temperature sensing means for indicating whether the temperature sensed thereby is in a first range below a first selectable level or in a second range between said first selectable level and a second selectable level or in a third range between said second selectable level and a third selectable level or in a fourth range above said third selectable level;

operating means for selectively defining either a normal operating mode or an energy save operating mode;

first coupling means actuable to selectively couple said heat and air condition units to said first zone;

second coupling means actuable to selectively couple said heat and air condition units to said second zone;

means responsive to said master thermostat means defining said heat mode and said operating means defining said energy save mode and said first or second zone thermostat means indicating said first range for respectively actuating said first and second coupling means and said heat unit;

means responsive to said master thermostat means defining said heat mode and said operating means defining said normal mode and said first or second zone thermostat means indicating said second range for respectively actuating said first and second coupling means and said heat unit;

means responsive to said master thermostat means defining said air condition mode and said operating means defining said normal mode and said first or second zone thermostat means indicating said third range for respectively actuating said first and second coupling means and said air condition unit; and means responsive to said master thermostat means defining said air condition mode and said operating means defining said energy save mode and said first or second zone thermostat means indicating said fourth range for respectively actuating said first and second coupling means and said air condition unit.

2. The system of claim 1 including means for generating an alarm signal when said master thermostat means indicates that the temperature thereat is above said first selectable level and said heat unit is actuated or is below said second selectable and said air condition unit is actuated.

3. The system of claim 2 further including a visual display means; and means responsive to said alarm signal for energizing said visual display means and for identifying each of said coupling means which is actuated.

4. The system of claim 1 further including offset adjust means for varying said first zone thermostat second selectable level dependent upon whether said master thermostat means defines said air condition mode or said heat mode.

5. The system of claim 1 further including at least one fire sensor capable of indicating a fire condition in said residence; and means responsive to said fire sensor indicating a fire condition for disabling said heat and air condition units.

6. The system of claim 1 further including timer means; and wherein said operating means is responsive to said timer means.

7. The system of claim 6 further including means for generating a shutdown command signal; and means responsive to said shutdown command signal for controlling said operating means independent of said timer means.

* * * * *